Feb. 23, 1926.
C. G. CLEMENT
1,574,468
TRAILER HITCH
Filed Dec. 5, 1919
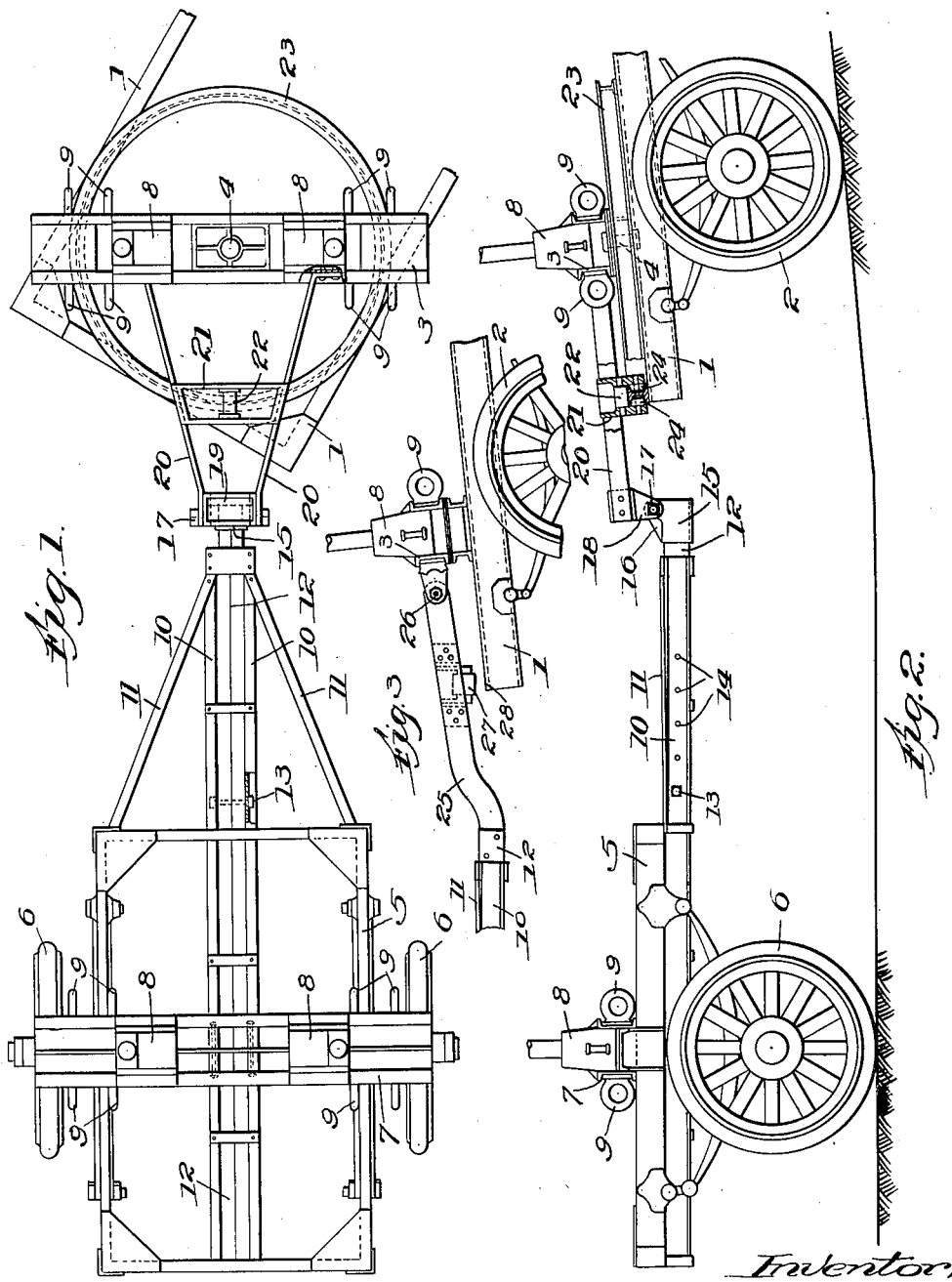

Patented Feb. 23, 1926.

1,574,468

UNITED STATES PATENT OFFICE.

CHARLES G. CLEMENT, OF EDGERTON, WISCONSIN, ASSIGNOR TO HIGHWAY TRAILER COMPANY, OF EDGERTON, WISCONSIN, A CORPORATION OF WISCONSIN.

TRAILER HITCH.

Application filed December 5, 1919. Serial No. 342,598.

*To all whom it may concern:*

Be it known that I, CHARLES G. CLEMENT, a citizen of the United States, and a resident of Edgerton, in the county of Rock and State of Wisconsin, have invented certain new and useful Improvements in Trailer Hitches, of which the following is a specification, reference being had to the accompanying drawings, forming a part thereof.

This invention relates to the combination of a truck and trailer arranged to carry a load of particularly long material such as poles or pipes, one end of the load being supported on a bolster on the truck and the other end being supported on the trailer. It is the purpose of the invention to provide means for hitching the trailer to the truck in such a manner that the load and the trailer vehicle shall trail properly, and substantially as a unit, from the truck. It consists in the features and elements of construction in conbination as hereinafter described and shown in the drawings and as indicated by the claims.

In the drawings:

Figure 1 is a top plan view of a trailer and the rear portion of the frame of a truck with a load-carrying bolster thereon and embodying a hitching device for attaching the trailer in accordance with this invention.

Figure 2 is a side elevation of the parts shown in Figure 1 with some details shown in section and with the truck and trailer in slightly different relative positions than in Figure 1.

Figure 3 is a view similar to Figure 2, showing a slightly modified form of attachment.

As shown in the drawings the rear portion of the truck frame is illustrated at 1, supported on rear wheels, 2, and fitted with a load-carrying bolster, 3, mounted to turn about a vertical pivot or king pin at 4. The trailer as illustrated is of two-wheel type, comprising a frame, 5, with wheels, 6, and being also provided with a bolster for supporting the load at 7,—this bolster, however, being shown as rigid with the frame, 5, instead of being swivelly mounted like the bolster, 3. Both bolsters, 3 and 7, are provided with the usual bolster blocks, 8, for laterally retaining the load and with rings, 9, to receive chains or ropes for securely tying the load in position.

Extending longitudinally of the trailer frame, 5, at the middle there are shown a pair of channel members, 10, disposed back to back and spaced apart and projecting forwardly from the frame, 5. The projecting forward ends of these members are braced by obliquely disposed members, 11, extending to the corners of the frame, 5, and between the members, 10, 10, a second pair of channels disposed face to face compose an extensible draw bar 12, being connected to the trailer frame by a transverse bolt, 13, which may be placed in any one of a series of holes, 14, in the members, 10, for adjusting the amount of protrusion of the draw bar, 12, from the forward end of the members, 10.

The draw bar, 12, is provided with a terminal, 15, having upwardly-extending lugs or ears, 16, apertured to engage a horizontal coupling bolt, 17, carried by downwardly-extending lugs or ears, 18, of a terminal fitting, 19, which forms a part of a draft yoke attached to the bolster, 3, on the truck. The yoke includes two members which are shown as rigidly attached to the rear face of the bolster, 3, at two laterally separated points thereon and which converge rearwardly to their connection with the terminal fitting, 19. At an intermediate position the members, 20, are transversely braced by a second fitting, 21, in which there is journaled an anti-friction roller, 22, positioned to ride on a curved track, 23, which is preferably of I-beam cross section, thus having a flanged tread with the under side of which the retaining rollers, 24, also carried by the fitting, 21, are engaged for holding the draft yoke in position on the track, and thus avoiding strain upon its connections to the bolster, 3.

With this construction it will be seen that as indicated in Figure 1, the connection between the draft yoke and the draw bar, 12, being laterally rigid, the trailer will always extend in a direction perpendicular to the bolster, 3, and will swing bodily with the bolster about the pivot, 4, for negotiating curves of the road. The connection is rendered sufficiently flexible, however, to accommodate the vehicle to irregularities of the road by virtue of the horizontal pivot bolt, 17, permitting the truck to begin the ascension of a hill or incline before the trailer has reached it, and similarly permitting a limited hinge action about the pivot, 17, in the opposite direction, in descending a slope. As the pivot, 17, is farther from the king pin, 4, of the bolster than either corner of the truck frame, 1, this accommodation is unhampered even when the vehicles are turning sharp corners.

By virtue of the laterally rigid connection the turning of the truck frame, 1, with respect to the trailer frame, 5, involves no change of distance between the bolsters, 3 and 7, whatever, but with the draft yoke as shown in Figure 2, it will be evident that there is a very slight change in this distance caused by the hinge action at bolt, 17. If preferred, this can be practically eliminated by the modified construction shown in Figure 3 in which the yoke, 25, is connected by horizontal pivots to the bolster, 3, and is provided with a roller, 27, which rides on a circular track but is not positively engaged therewith as is the case when the retaining rollers, 24, are employed, as in Figure 2.

I claim:—

1. In the combination of a tractor truck and a trailer, a load-carrying bolster mounted on the truck for turning about a vertical axis, a draft member extending rearwardly from the bolster, laterally rigid with respect thereto and overhanging the rear end of the truck; a track on the truck formed concentrically about the vertical axis of the bolster and extending under said draft member, said track having a flange which serves as a tread; means on the draft member adapted to ride on said tread, and means on the draft member engaging under said flange to retain the parts in that relation.

2. In the combination of a tractor truck and a trailer, a load-carrying bolster mounted on the truck for turning about a vertical axis, a draft member extending rearwardly from the bolster, said draft member being a yoke composed of two members attached to said bolster at laterally separated points respectively, converging and rearwardly overhanging the rear end of the truck; a track on the truck formed concentrically about the vertical axis on which the bolster turns, a roller carried between the two draft members to ride on said track, the track having a flanged tread and a retaining roller engaging under the flange of the track and carried by the draft yoke.

3. In the combination defined in claim 2, a drawbar on the trailer extending forward therefrom, and a hinged connection between the draft yoke and drawbar about a horizontal axis at a point further distant from the vertical axis of the bolster than is the corner of the truck.

4. In the combination of a tractor truck and a trailer, a load-carrying bolster mounted on the truck for turning about a vertical axis, a draft yoke composed of two members attached to said bolster at laterally separated points respectively and converging rearwardly, overhanging the rear end of the truck, a track on the truck upwardly extending therefrom and formed concentrically about the vertical axis on which the bolster turns, a fitting secured to and depending from said draft yoke arranged to straddle said track whereby the draft is transmitted to the track for relieving the bolster of draft strain.

In testimony whereof, I have hereunto set my hand at Edgerton, Wis., this 20th day of November, 1919.

CHARLES G. CLEMENT.